(12) United States Patent
Sasaki

(10) Patent No.: US 12,377,739 B2
(45) Date of Patent: Aug. 5, 2025

(54) CHARGING INLET APPARATUS

(71) Applicant: TOYOTA JIDOSHA KABUSHIKI KAISHA, Toyota (JP)

(72) Inventor: Masaru Sasaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 365 days.

(21) Appl. No.: 18/101,343

(22) Filed: Jan. 25, 2023

(65) Prior Publication Data

US 2023/0302930 A1    Sep. 28, 2023

(30) Foreign Application Priority Data

Mar. 22, 2022  (JP) ................. 2022-045523

(51) Int. Cl.
*B60L 53/16* (2019.01)
*B60Q 1/00* (2006.01)
*H01R 13/502* (2006.01)
*H01R 13/717* (2006.01)

(52) U.S. Cl.
CPC ............ *B60L 53/16* (2019.02); *B60Q 1/0017* (2013.01); *H01R 13/502* (2013.01); *H01R 13/717* (2013.01); *H01R 2201/26* (2013.01)

(58) Field of Classification Search
CPC ....... B60L 53/16; B60Q 1/0017; B60Q 1/543; B60Q 1/2661; H01R 13/502; H01R 13/717; H01R 2201/26; B60K 2015/0515; B60K 2015/0576; B60K 15/05; Y02T 10/70; Y02T 10/7072; Y02T 90/14; B62D 25/24; G08B 5/36
See application file for complete search history.

(56) References Cited

U.S. PATENT DOCUMENTS

| | | | | |
|---|---|---|---|---|
| 5,757,595 A | * | 5/1998 | Ozawa ..................... | B60L 58/12 340/455 |
| 8,376,767 B2 | * | 2/2013 | Kahara .................... | B60L 53/65 439/304 |
| 8,376,768 B2 | * | 2/2013 | Kurumizawa .......... | B60L 53/65 439/304 |
| 8,827,731 B2 | * | 9/2014 | Sasaki .................... | H01R 13/46 439/206 |
| 9,083,163 B2 | * | 7/2015 | Tamaoki .................. | E06B 7/00 |

(Continued)

FOREIGN PATENT DOCUMENTS

| | | |
|---|---|---|
| JP | 09-285022 A | 10/1997 |
| JP | 2017-61188 A | 3/2017 |

(Continued)

*Primary Examiner* — Abdullah A Riyami
*Assistant Examiner* — Nader J Alhawamdeh
(74) *Attorney, Agent, or Firm* — Sughrue Mion, PLLC

(57) ABSTRACT

A charging inlet apparatus includes an inlet box and one or more electrical components. The inlet box is provided at a charging opening of a vehicle. A charging inlet is disposed in the inlet box. One or more electrical components are mounted on a mounting surface of the inlet box from a vehicle cabin side of the vehicle and have a waterproof object area. The mounting surface is inclined toward the vehicle cabin side with respect to a vertical direction. The inlet box includes one or more canopy portions that project from the inlet box so as to be located over the one or more electrical components.

5 Claims, 4 Drawing Sheets

(56) References Cited

U.S. PATENT DOCUMENTS

| | | | | |
|---|---|---|---|---|
| 2013/0078846 A1* | 3/2013 | Sasaki | ................ | B60L 53/31 |
| | | | | 439/374 |
| 2014/0256172 A1* | 9/2014 | Kakizaki | ............ | B60L 53/16 |
| | | | | 439/350 |
| 2015/0239360 A1* | 8/2015 | Sasaki | ................ | B60L 53/16 |
| | | | | 320/109 |
| 2017/0080851 A1* | 3/2017 | Matsuoka | ........ | B60Q 1/2661 |
| 2017/0341523 A1* | 11/2017 | Hirashita | ............ | B60L 53/16 |
| 2023/0302930 A1* | 9/2023 | Sasaki | ................ | B60K 15/05 |

FOREIGN PATENT DOCUMENTS

| | | | |
|---|---|---|---|
| JP | 2018-207682 A | | 12/2018 |
| JP | 2020-98676 A | | 6/2020 |
| JP | 2020098676 A | * | 6/2020 |

\* cited by examiner

CHARGING INLET APPARATUS

CROSS-REFERENCE TO RELATED APPLICATION

This application claims priority to Japanese Patent Application No. 2022-045523 filed on Mar. 22, 2022, incorporated herein by reference in its entirety.

BACKGROUND

1. Technical Field

The disclosure relates to a charging inlet apparatus mounted on a vehicle.

2. Description of Related Art

Japanese Unexamined Patent Application Publication No. 09-285022 (JP 09-285022 A) describes a state of charge display device for a battery electric vehicle. The state of charge display device includes a battery charging connector (charging inlet), a lid, and a display panel. The battery charging connector is provided on a vehicle body exterior of the battery electric vehicle. The lid is provided at a location to cover the battery charging connector so as to be openable and closable. The display panel is provided in a compartment covered with the lid (in an inlet box). The display panel displays the time required to full charge a battery or the charge level of the battery or both.

SUMMARY

As described above, JP 09-285022 A describes the display panel as an example of an electrical component accompanied with the charging inlet. An electric line is, for example, connected to such an electrical component via the connector on a vehicle cabin side with respect to the inlet box. There are concerns that, due to the reason, such as condensation formed around the electrical component on the vehicle cabin side, water falls on a non-waterproof part (in other words, waterproof object area), such as a connector fitting part of the electrical component.

More specifically, an area of the electrical component, located on the vehicle cabin side, is covered with an interior component of the vehicle and disposed in a place hidden from the vehicle cabin. However, there are concerns that water falls on the non-waterproof part (waterproof object area) of the electrical component due to the reason, such as the above-described condensation that is formed in a space surrounded by the interior component and a component, including the inlet box, and entry of water into the space through a gap between the interior component and a window glass.

The disclosure provides a charging inlet apparatus capable of reducing falls of water on one or more electrical components having a waterproof object area while suppressing an increase in cost.

A charging inlet apparatus according to an aspect of the disclosure includes an inlet box and one or more electrical components. The inlet box is provided at a charging opening of a vehicle. A charging inlet is disposed in the inlet box. One or more electrical components are mounted on a mounting surface of the inlet box from a vehicle cabin side of the vehicle and have a waterproof object area. The mounting surface is inclined toward the vehicle cabin side with respect to a vertical direction. The inlet box includes one or more canopy portions that project from the inlet box so as to be located over the one or more electrical components.

The one or more canopy portions may be inclined with respect to a straight line parallel to a horizontal direction when viewed in a direction perpendicular to the mounting surface.

The one or more canopy portions each may have a distal end and a proximal end with respect to the inlet box and may be inclined such that the distal end is lower in level than the proximal end.

The one or more electrical components may include a charging indicator configured to light up when charging using the charging inlet is performed.

The one or more electrical components may include a charging inlet lamp configured to illuminate an area around the charging inlet when a charging lid configured to open and close the charging opening is opened.

The one or more electrical components may include a charging indicator configured to light up when charging using the charging inlet is performed, and a charging inlet lamp configured to illuminate an area around the charging inlet when a charging lid configured to open and close the charging opening is opened. The one or more canopy portions may be a canopy portion disposed over the charging indicator and the charging inlet lamp arranged in a vertical direction.

With the charging inlet apparatus according to the aspect of the disclosure, by using the canopy portion with a simple configuration, that is a projection formed so as to project from the inlet box, falls of water produced or entered in a space around the charging inlet apparatus on the vehicle cabin side on the one or more electrical components are reduced. The mounting surface for the one or more electrical components in the inlet box is inclined toward the vehicle cabin side with respect to the vertical direction. Thus, in comparison with the case where the mounting surface is not inclined, falls on the one or more electrical components are reduced while the amount of projection of the canopy portion is suppressed. A reduction in the amount of projection of the canopy portion means easy formation of the inlet box having the canopy portion, so it is beneficial in terms of cost. As described above, with the charging inlet apparatus according to the aspect of the disclosure, water-resistant measures for one or more electrical components are suitably taken while an increase in cost is suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the disclosure will be described with reference to the accompanying drawings.

Like reference signs denote elements common to all the drawings, and the repeated description will be omitted or simplified. In the following embodiment, when the number, count, amount, or range of each element is referred to, the technical idea according to the disclosure is not limited thereto unless otherwise specified or apparently determined to that in principle.

1. Configuration Example of Charging Inlet Apparatus

Figure 1:
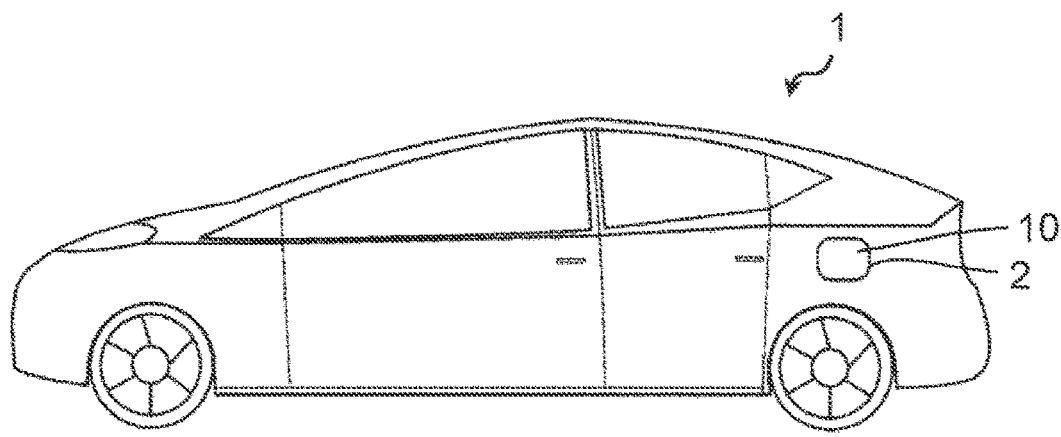
FIG. 1 is a view that shows the external appearance of a vehicle including a charging inlet apparatus according to an embodiment.

FIG. 1 is a view that shows the external appearance of a vehicle 1 including a charging inlet apparatus 10 according to the embodiment. The charging inlet apparatus is mounted on the vehicle 1. Specifically, for example, as shown in FIG. 1, the charging inlet apparatus 10 has a charging opening (opening) 2 formed in an outer panel (for example, a rear quarter panel) located at the side rear of the vehicle 1. The charging inlet apparatus is connected to a charging cable from a charging facility and is used to charge a battery mounted on the vehicle 1. The vehicle 1 is, for example, a battery electric vehicle (BEV) or a plug-in hybrid electric vehicle (PHEV).

Figure 2:
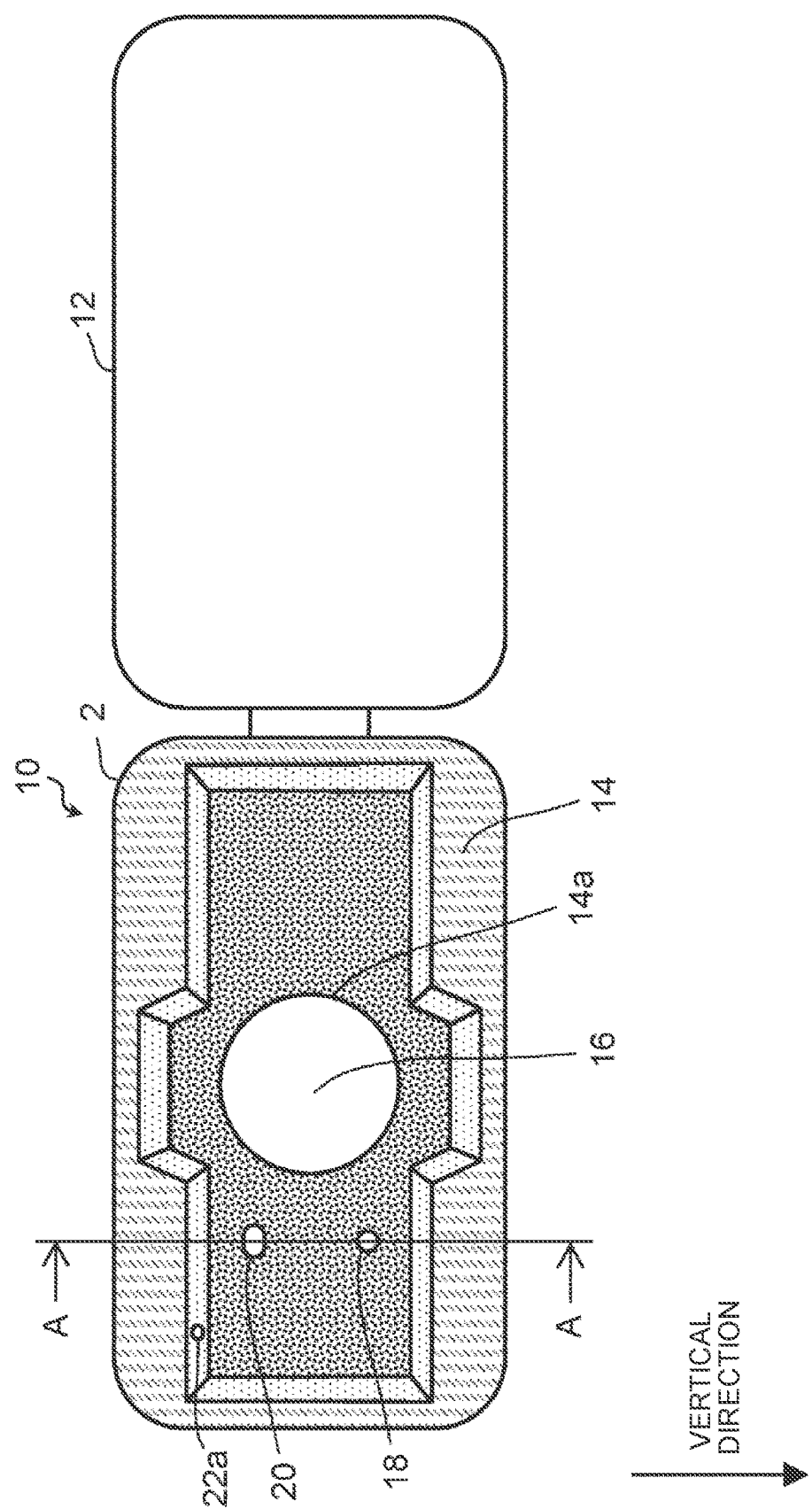
FIG. 2 is a view that shows the charging inlet apparatus shown in FIG. 1 when viewed from an outer side of the vehicle (vehicle outer side)
Figure 3:
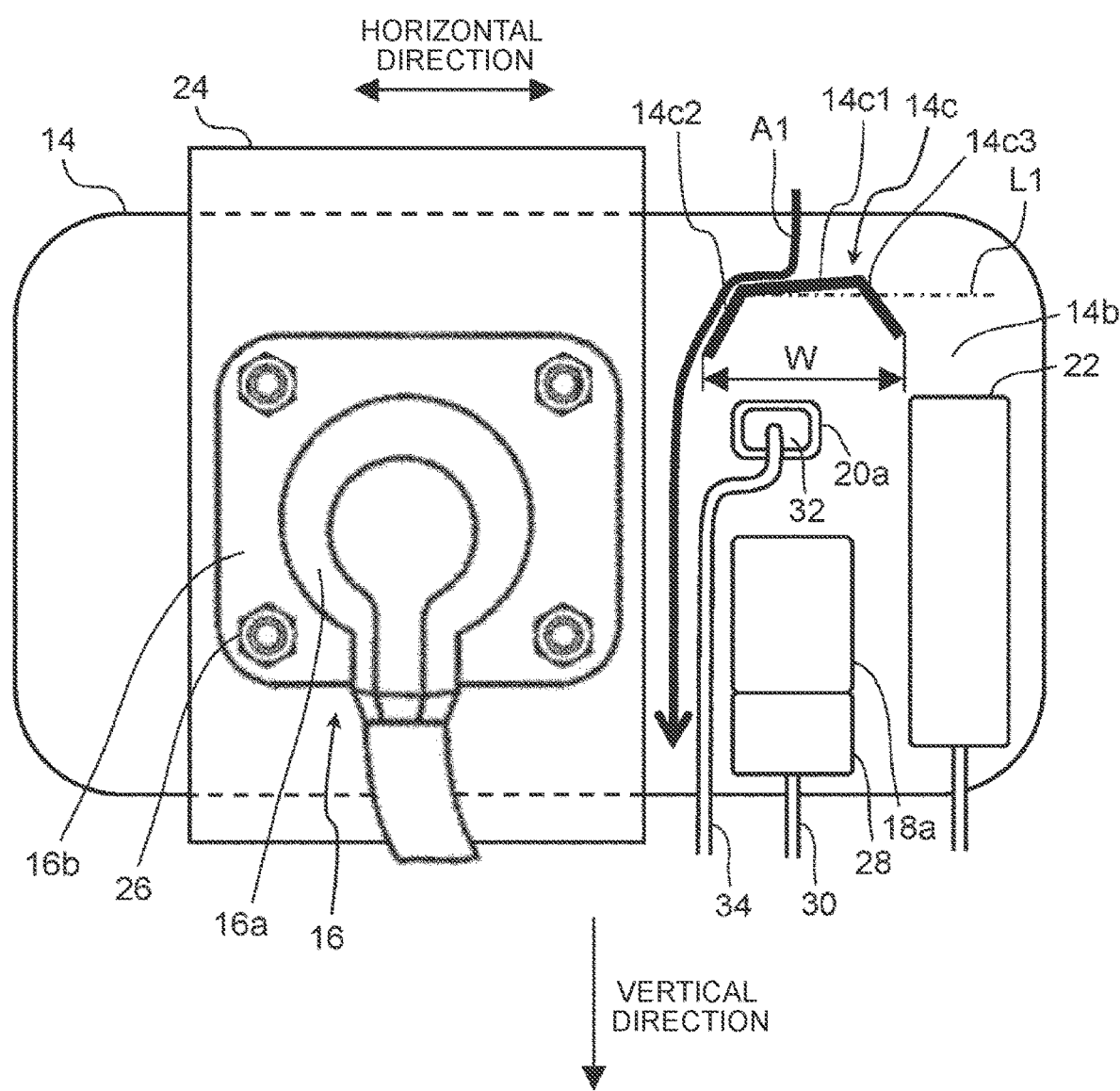
FIG. 3 is a view that shows the charging inlet apparatus shown in FIG. 1 when viewed from an inner side of the vehicle (vehicle cabin side)

FIG. 2 is a view that shows the charging inlet apparatus 10 shown in FIG. 1 when viewed from the outer side (vehicle outer side) of the vehicle 1. More specifically, FIG. 2 is a view that shows the charging inlet apparatus 10 when viewed from the vehicle outer side in a direction perpendicular to a mounting surface 14b (see FIG. 4 (described later)) of an inlet box 14. FIG. 3 is a view that shows the charging inlet apparatus 10 shown in FIG. 1 when viewed from the inner side (vehicle cabin side, that is, the side opposite to FIG. 2) of the vehicle 1.

As shown in FIG. 2, the charging inlet apparatus 10 includes a charging lid 12, the inlet box 14, a charging inlet 16, a charging indicator 18, a charging inlet lamp 20, and a lid lock actuator 22.

The charging lid 12 is a lid configured to open and close the charging opening 2. The inlet box 14 is provided at the charging opening 2 and is also referred to as lid box. The inlet box 14 is a box-shaped housing. The charging inlet 16 is disposed in the inlet box 14. The inlet box 14 is made of, for example, resin or sheet metal. The inlet box 14 is mounted by, for example, a method, such as welding, engagement, or the like to the outer panel in which the charging opening 2 is formed.

More specifically, the inlet box 14 has an opening 14a. The charging inlet 16 is disposed so as to extend through the opening 14a. The distal end of the charging inlet 16 is exposed to outside the vehicle 1 in the inlet box 14. As shown in FIG. 3, the charging inlet 16 has a body 16a and a flange 16b. The body 16a accommodates connecting pins to which a charging connector is connected. The flange 16b radially extends from the periphery of the body 16a in a rectangular shape. The flange 16b is fixed to an inlet bracket 24 via fasteners 26. The body 16a of the charging inlet 16 extends through the opening 14a and also through an opening formed in the inlet bracket 24. The inlet bracket 24 is mounted to a structural member (not shown) of the vehicle 1.

When the battery of the vehicle 1 is charged, a charging cable is connected to the charging inlet 16 via a charging facility-side charging connector. In the example of the charging inlet apparatus 10 shown in FIG. 1, only the charging inlet (alternating-current inlet) 16 that uses alternating-current power is provided. However, the "charging inlet apparatus" according to the disclosure is not limited to an alternating-current inlet and may include a direct-current inlet that uses direct-current power as a charging inlet.

The charging indicator 18 is configured to light up when the battery is charged using the charging inlet 16. As shown in FIG. 2, the charging indicator 18 is mounted to the inlet box 14. As shown in FIG. 3, the charging indicator 18 has a connector part 18a disposed on the vehicle cabin side with respect to the inlet box 14. When the connector part 18a is fitted to the connector 28, the connector part 18a is connected via the connector 28 to an electric line 30 that supplies a signal and electric power to the charging indicator 18.

The charging inlet lamp 20 is a lamp (courtesy lamp) configured to light up so as to illuminate an area around the charging inlet 16 when the charging lid 12 is opened. As shown in FIG. 2, the charging inlet lamp 20 is mounted to the inlet box 14. As shown in FIG. 3, the charging inlet lamp 20 has a connector part 20a disposed on the vehicle cabin side with respect to the inlet box 14. When the connector part 20a is fitted to the connector 32, the connector part 20a is connected via the connector 32 to an electric line 34 that supplies a signal and electric power to the charging inlet lamp 20.

The lid lock actuator 22 includes a pin 22a (see FIG. 2) configured to project and engage with the charging lid 12 when the charging lid 12 is closed. The lid lock actuator 22 is an actuator used to lock the charging lid 12 in a closed state. As shown in FIG. 3, the lid lock actuator 22 is disposed on the vehicle cabin side with respect to the inlet box 14 and is mounted to the inlet box 14.

2. Water-Resistant Measures for Electrical Components

Figure 4:
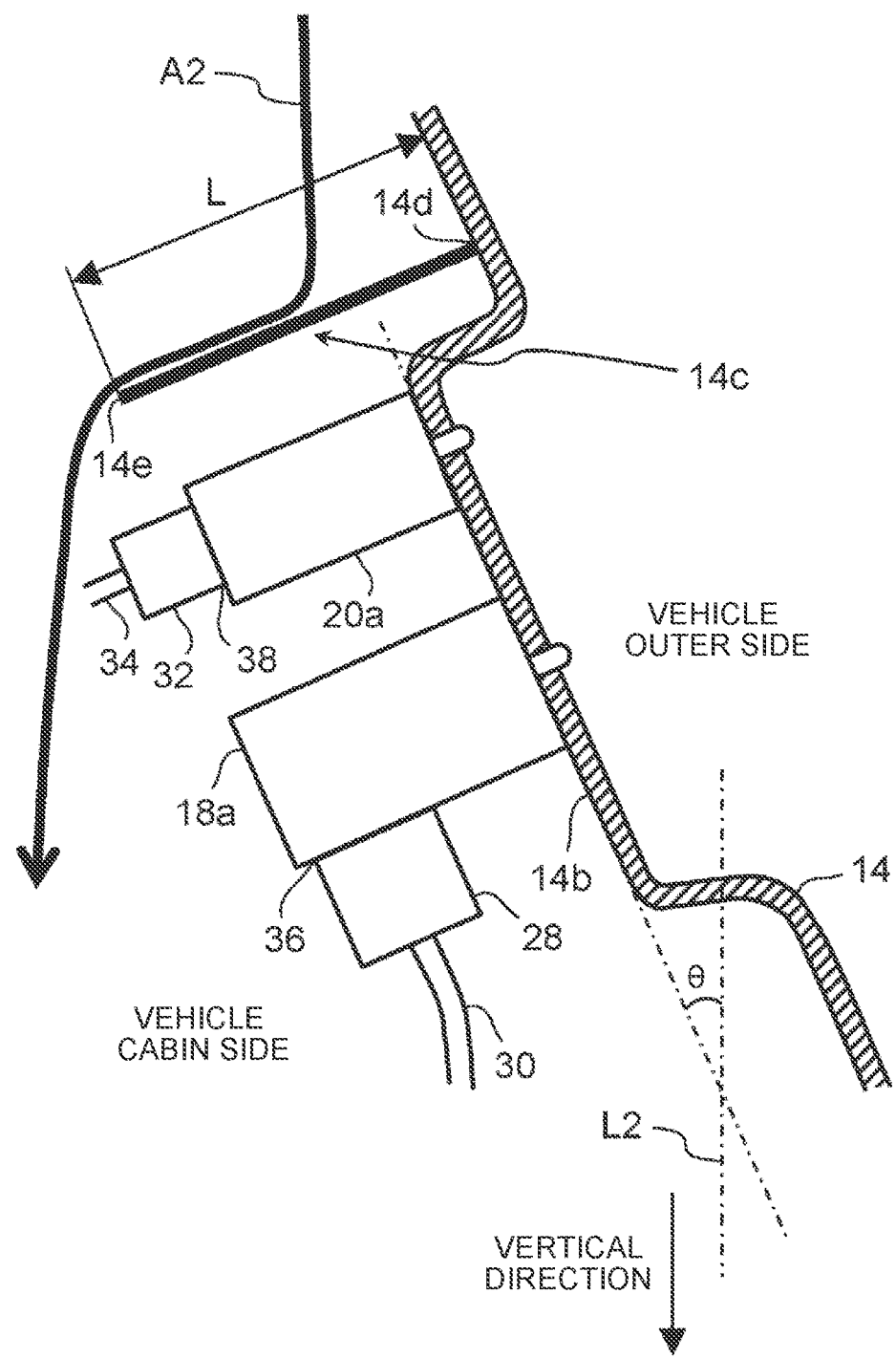
FIG. 4 is a sectional view taken along the line A-A in FIG. 2.

The charging inlet apparatus 10 includes the charging indicator 18 and the charging inlet lamp 20 as examples of electrical components accompanied with the charging inlet 16. A structure provided in the charging inlet apparatus 10 as water-resistant measures for the electrical components (the charging indicator 18 and the charging inlet lamp 20) will be described with reference to FIG. 4 in addition to FIG. 3. FIG. 4 is a sectional view taken along the line A-A in FIG. 2.

The charging indicator 18 has a connector fitting part 36 between the connector part 18a and the connector 28 as an area on the vehicle cabin side. Similarly, the charging inlet lamp 20 has a connector fitting part 38 between the connector part 20a and the connector 32 as an area on the vehicle cabin side.

Here, an area where the electrical components located on the vehicle cabin side as shown in FIG. 4 is covered with an interior component (not shown) of the vehicle 1 and disposed in a place hidden from the vehicle cabin. Therefore, the electrical components basically have non-waterproof specifications. However, in a space surrounded by the interior component and a component, including the inlet box 14, for example, water is formed due to condensation or water enters into the space or entry of water into the space through a gap between the interior component and a window glass. As a result, there are concerns that water falls on the non-waterproof part of the electrical components. In the examples of the charging indicator 18 and the charging inlet lamp 20, the connector fitting parts 36, 38 correspond to such a non-waterproof part (in other words, waterproof object area). Another example of the waterproof object area of an electrical component is a bus bar connected to the electrical component and not coated.

As water-resistant measures for the waterproof object area, for example, the connector part 18a of the charging indicator 18 and the connector part 20a of the charging inlet lamp 20 are conceivably set as waterproof specifications. However, with the above measures, cost for the charging inlet apparatus can increase or it can be difficult to establish a charging inlet apparatus in a space limited due to enlargement of the size of the connector.

In light of the above-described inconvenience, the charging inlet apparatus according to the present embodiment includes the following configuration. In other words, as shown in FIG. 4, the mounting surface 14b for the charging indicator 18 and the charging inlet lamp 20 in the inlet box 14 is inclined (fallen down) toward the vehicle cabin side by an inclination angle of θ with respect to a straight line L2 parallel to a vertical direction.

More specifically, the inlet box 14 has a canopy portion 14c. The canopy portion 14c projects from the inlet box 14 so as to be located over the charging indicator 18 and the charging inlet lamp 20. In other words, the canopy portion 14c (projection) is formed integrally with the inlet box 14. The amount of projection (length) L of the canopy portion 14c from the wall surface of the inlet box 14 is set to a value required for water falling from above does not fall on the connector fitting parts 36, 38 as indicated by the arrow A2 in FIG. 4.

More specifically, when viewed in a direction perpendicular to the mounting surface 14b as shown in FIG. 3, the canopy portion 14c is inclined with respect to a straight line L1 parallel to a horizontal direction. In the example shown in FIG. 3, the canopy portion 14c has a central part 14c1 and end parts 14c2, 14c3 each continuous with the central part 14c1 in the horizontal direction. In this example, any of the central part 14c1 and the end parts 14c2, 14c3 is inclined with respect to the straight line L1 parallel to the horizontal direction. The overall width of the canopy portion 14c in the horizontal direction is formed with a width W greater than the width of each of the connector fitting parts 36, 38 in the same direction. More specifically, when viewed in the horizontal direction, the connector fitting parts 36, 38 each are within the width W of the canopy portion 14c.

Different from the example of the canopy portion 14c shown in FIG. 3, the canopy portion according to the disclosure may, for example, have only the central part 14c1 while ensuring the above-described width W as an area inclined with respect to the straight line L1 parallel to the horizontal direction. As another example of the canopy portion inclined with respect to the straight line L1 parallel to the horizontal direction, when viewed in a direction perpendicular to the mounting surface 14b as shown in FIG. 3, the canopy portion may have, for example, an upward-convex semi-annular shape.

As shown in FIG. 4, the canopy portion 14c has a distal end 14e and a proximal end 14d and is inclined such that the distal end 14e is lower in level than the proximal end 14d with respect to the inlet box 14. More specifically, for example, the canopy portion 14c is formed so as to extend in a direction perpendicular to the mounting surface 14b as shown in FIG. 4.

In the example of the charging inlet apparatus 10 shown in FIG. 1, the charging indicator 18 and the charging inlet lamp 20 that are two electrical components are arranged in the vertical direction as shown in FIG. 3. The canopy portion 14c is a canopy portion disposed over the charging indicator 18 and the charging inlet lamp 20 arranged in the vertical direction in this way.

Depending on the configuration of the charging inlet apparatus 10, the plurality of electrical components such as the charging indicator 18 and the charging inlet lamp 20 may not always be arranged in the vertical direction. In such a case, an inlet box may have a plurality of canopy portions formed to respectively cover the plurality of electrical components. In addition, in the example shown in FIG. 1, the charging inlet lamp is disposed above the charging indicator 18. Alternatively, the arrangement of both components in this example may be reversed.

3. Advantageous Effects

As described above, with the charging inlet apparatus 10 according to the present embodiment, as illustrated with the arrow A2 in FIG. 4, falls of water, produced or entered in a space around the charging inlet apparatus 10 on the vehicle cabin side, on the charging indicator 18 and the charging inlet lamp 20 are reduced by using the canopy portion 14c. The canopy portion 14c is implemented with a simple configuration, that is, a projection formed to project from the inlet box 14. Therefore, water-resistant measures are taken while an increase in cost is suppressed.

With the charging inlet apparatus 10 according to the present embodiment, the mounting surface 14b for the charging indicator 18 and the charging inlet lamp 20 in the inlet box 14 is inclined toward the vehicle cabin side with respect to the vertical direction. Thus, in comparison with the case where the mounting surface 14b is not inclined (when the inclination angle θ of FIG. 4 is zero), falls of water on the charging indicator 18 and the charging inlet lamp 20 are reduced while the amount L of projection of the canopy portion 14c is suppressed. A reduction in the amount L of projection of the canopy portion 14c (projection) means easy formation of the inlet box 14 having the canopy portion 14c, so it is beneficial in terms of cost. With the charging inlet apparatus 10, in terms of this point as well, the water-resistant measures are taken while an increase in cost is suppressed.

When viewed in a direction perpendicular to the mounting surface 14b as shown in FIG. 3, the canopy portion 14c is inclined with respect to the straight line L1 parallel to the horizontal direction. Here, the canopy portion according to the disclosure does not always need to be inclined with respect to the straight line L1 parallel to the horizontal direction as in the case of the example of the canopy portion 14c. With the canopy portion 14c inclined with respect to the straight line L1 parallel to the horizontal direction, as illustrated with the arrow A1 in FIG. 3, water falling down onto the canopy portion 14c from just above the connector parts 18a, 20a is guided to flow along the top surface of the canopy portion 14c in the horizontal direction (right and left direction on the drawing sheet) and then drops downward at a location off the connector parts 18a, 20a. Therefore, with the inclined shape, it is possible to further effectively suppress falls of water on the connector parts 18a, 20a.

In addition, as in the case of the example of FIG. 3, the end parts 14c2, 14c3 having a steeper inclination than the central part 14c1 are respectively provided on both sides of the central part 14c1 inclined with respect to the straight line L1. Therefore, it is possible to reduce a situation in which water flowing along the top surface of the central part 14c1 flows onto the bottom surface (back surface) of the central part 14c1 due to surface tension and drips onto the connector parts 18a, 20a.

As shown in FIG. 4, the canopy portion 14c has a distal end 14e and a proximal end 14d and is inclined such that the distal end 14e is lower in level than the proximal end 14d with respect to the inlet box 14. Here, the canopy portion according to the disclosure does not need to be inclined in this way. With the canopy portion 14c inclined such that the distal end 14e is lower in level than the proximal end 14f with respect to the inlet box 14, as illustrated with the arrow A2 in FIG. 4, water falling down from above onto the canopy portion 14c is smoothly guided downward such that water does not accumulate on the canopy portion 14c.

As shown in FIG. 4, the canopy portion 14c is formed as a canopy portion disposed over the charging indicator 18 and the charging inlet lamp 20 arranged in the vertical direction. With such a configuration example, water-resistant measures for a plurality of electrical components are implemented by using the one (one-site) canopy portion 14c at low cost.

In the above-described embodiment, as examples of the one or more electrical components having a waterproof object area, the charging indicator 18 and the charging inlet lamp 20 have been described. However, as long as electrical components are mounted from the vehicle cabin side to the mounting surface of an inlet box and have a waterproof object area (for example, a connector fitting part or an uncoated busbar), the electrical components may apply to the one or more electrical components according to the disclosure. Specifically, for example, as long as a lid lock actuator has a waterproof object area, the lid lock actuator may apply to the one or more electrical components.

What is claimed is:

1. A charging inlet apparatus comprising:
   an inlet box provided at a charging opening of a vehicle and in which a charging inlet is disposed; and
   one or more electrical components mounted on a mounting surface of the inlet box from a vehicle cabin side of the vehicle and having a waterproof object area, wherein:
   the mounting surface is inclined toward the vehicle cabin side with respect to a vertical direction; and
   the inlet box includes one or more canopy portions that project from the inlet box so as to be located over the one or more electrical components, wherein:
   the one or more electrical components include
      a charging indicator configured to light up when charging using the charging inlet is performed, and
      a charging inlet lamp configured to illuminate an area around the charging inlet when a charging lid configured to open and close the charging opening is opened; and
   the one or more canopy portions are a canopy portion disposed over the charging indicator and the charging inlet lamp arranged in a vertical direction.

2. The charging inlet apparatus according to claim 1, wherein the one or more canopy portions are inclined with respect to a straight line parallel to a horizontal direction when viewed in a direction perpendicular to the mounting surface.

3. The charging inlet apparatus according to claim 1, wherein the one or more canopy portions each have a distal end and a proximal end with respect to the inlet box and are inclined such that the distal end is lower in level than the proximal end.

4. The charging inlet apparatus according to claim 1, wherein the one or more electrical components include a charging indicator configured to light up when charging using the charging inlet is performed.

5. The charging inlet apparatus according to claim 1, wherein the one or more electrical components include a charging inlet lamp configured to illuminate an area around the charging inlet when a charging lid configured to open and close the charging opening is opened.

* * * * *